United States Patent
Ganz et al.

(10) Patent No.: US 8,612,302 B2
(45) Date of Patent: Dec. 17, 2013

(54) CREDIT SWAP IN A VIRTUAL WORLD

(75) Inventors: Howard Ganz, North York (CA); Karl Joseph Borst, Woodbridge (CA)

(73) Assignee: Ganz, Woodbridge, Ontario ( * ) Notice: Subject to any disclaimer, the term of this patent is extended or adjusted under 35 U.S.C. 154(b) by 0 days.

(21) Appl. No.: 13/398,018

(22) Filed: Feb. 16, 2012

(65) Prior Publication Data

US 2012/0197692 A1   Aug. 2, 2012

Related U.S. Application Data

(63) Continuation-in-part of application No. 11/942,318, filed on Nov. 19, 2007.

(51) Int. Cl.
*G06Q 40/00* (2012.01)

(52) U.S. Cl.
USPC .................. 705/26.1; 704/14.43; 704/14.16; 704/14.27; 704/44

(58) Field of Classification Search
USPC ............... 705/26.1, 14.43, 14.16, 14.27, 44; 235/380, 487
See application file for complete search history.

(56) References Cited

U.S. PATENT DOCUMENTS

| | | | |
|---|---|---|---|
| 5,411,259 A | 5/1995 | Pearson et al. | |
| 5,768,382 A | 6/1998 | Schneier et al. | |
| 5,907,831 A | 5/1999 | Lotvin et al. | |
| 5,923,330 A | 7/1999 | Tarlton et al. | |
| 6,009,458 A | 12/1999 | Hawkins et al. | |
| 6,119,229 A | 9/2000 | Martinez et al. | |
| 6,159,101 A | 12/2000 | Simpson | |
| 6,175,857 B1 | 1/2001 | Hachiya et al. | |
| 6,178,407 B1 | 1/2001 | Lotvin et al. | |
| 6,267,672 B1 | 7/2001 | Vance | |
| 6,273,815 B1 | 8/2001 | Stuckman | |
| 6,290,566 B1 | 9/2001 | Gabai et al. | |
| 6,404,438 B1 | 6/2002 | Hatlelid et al. | |
| 6,468,155 B1 | 10/2002 | Zucker et al. | |
| 6,476,830 B1 | 11/2002 | Farmer et al. | |
| 6,494,762 B1 | 12/2002 | Bushmitch et al. | |
| 6,519,771 B1 | 2/2003 | Zenith | |

(Continued)

FOREIGN PATENT DOCUMENTS

| | | |
|---|---|---|
| CA | 2331244 A1 | 7/2001 |
| CA | 2378301 A1 | 9/2002 |

(Continued)

OTHER PUBLICATIONS

Wayback Machine Internet archive from original website Dec. 10, 2004; http://web.archive.org/web/20041210035624/http://distributedcomputing.info/ap-charity.html.

(Continued)

*Primary Examiner* — Daniel Felten
(74) *Attorney, Agent, or Firm* — Pearne & Gordon LLP

(57) ABSTRACT

Rewards, which can be virtual currency which can include items, on one website are transferred to be used on another website. The one website on which the rewards are earned has reciprocity with other websites, and can send those rewards to another website, either associated with the user's own account, or with someone else's account. In one embodiment, the rewards can be transferred even if the user who earns those rewards does not participate in the website that is receiving the transfer.

20 Claims, 4 Drawing Sheets

(56) References Cited

U.S. PATENT DOCUMENTS

| | | |
|---|---|---|
| 6,522,333 B1 | 2/2003 | Hatlelid et al. |
| 6,595,858 B1 | 7/2003 | Tajiri |
| 6,612,501 B1 | 9/2003 | Woll et al. |
| 6,616,532 B2 | 9/2003 | Albrecht |
| 6,663,105 B1 | 12/2003 | Sullivan et al. |
| 6,692,360 B2 | 2/2004 | Kusuda et al. |
| 6,722,973 B2 | 4/2004 | Akaishi |
| 6,722,989 B1 | 4/2004 | Hayashi |
| 6,729,884 B1 | 5/2004 | Kelton et al. |
| 6,745,236 B1 | 6/2004 | Hawkins et al. |
| 6,758,746 B1 | 7/2004 | Hunter et al. |
| 6,773,325 B1 | 8/2004 | Mawle et al. |
| 6,773,344 B1 | 8/2004 | Gabai et al. |
| 6,910,186 B2 | 6/2005 | Kim |
| 6,918,833 B2 | 7/2005 | Emmerson et al. |
| 6,948,131 B1 | 9/2005 | Neven et al. |
| 6,951,516 B1 | 10/2005 | Eguchi et al. |
| 6,954,728 B1 | 10/2005 | Kusumoto et al. |
| 6,959,166 B1 | 10/2005 | Gabai et al. |
| 7,037,166 B2 | 5/2006 | Shrock et al. |
| 7,066,781 B2 | 6/2006 | Weston |
| 7,081,033 B1 | 7/2006 | Mawle et al. |
| 7,113,913 B1 | 9/2006 | Davis et al. |
| 7,143,358 B1 | 11/2006 | Yuen |
| 7,171,154 B2 | 1/2007 | Fujisawa |
| 7,191,220 B2 | 3/2007 | Ohwa |
| 7,203,656 B2 | 4/2007 | Lotvin et al. |
| 7,249,139 B2 | 7/2007 | Chuah et al. |
| 7,266,522 B2 | 9/2007 | Dutta et al. |
| 7,300,344 B2 | 11/2007 | Fujioka et al. |
| 7,314,407 B1 | 1/2008 | Pearson |
| 7,465,212 B2 | 12/2008 | Ganz |
| 7,478,047 B2 | 1/2009 | Loyall et al. |
| 7,488,231 B2 | 2/2009 | Weston |
| 7,534,157 B2 | 5/2009 | Ganz |
| 7,556,563 B2 | 7/2009 | Ellis et al. |
| 7,742,943 B2 | 6/2010 | Postrel |
| 7,765,124 B2 | 7/2010 | Postrel |
| 7,769,630 B2 | 8/2010 | Postrel |
| 7,778,907 B1 | 8/2010 | Haskins et al. |
| 7,862,428 B2 | 1/2011 | Borge |
| 8,088,002 B2 | 1/2012 | Ganz |
| 2002/0010004 A1 | 1/2002 | Matsumura |
| 2002/0029179 A1 | 3/2002 | Gruber et al. |
| 2002/0049847 A1 | 4/2002 | McArdle et al. |
| 2002/0107073 A1 | 8/2002 | Binney |
| 2002/0119810 A1 | 8/2002 | Takatsuka et al. |
| 2002/0160835 A1 | 10/2002 | Fujioka et al. |
| 2002/0165777 A1 | 11/2002 | Lotvin et al. |
| 2002/0183119 A1 | 12/2002 | Fessler |
| 2002/0198781 A1 | 12/2002 | Cobley |
| 2003/0126031 A1 | 7/2003 | Asami |
| 2004/0043806 A1 | 3/2004 | Kirby |
| 2004/0053690 A1 | 3/2004 | Fogel et al. |
| 2004/0093266 A1 | 5/2004 | Dohring |
| 2004/0093302 A1 | 5/2004 | Baker et al. |
| 2004/0143852 A1 | 7/2004 | Meyers |
| 2004/0193489 A1 | 9/2004 | Boyd et al. |
| 2004/0225518 A1 | 11/2004 | Bain |
| 2004/0225605 A1 | 11/2004 | Rowe |
| 2004/0242326 A1 | 12/2004 | Fujisawa |
| 2004/0249735 A1 | 12/2004 | Cassani |
| 2005/0027626 A1 | 2/2005 | Garcia |
| 2005/0059483 A1 | 3/2005 | Borge |
| 2005/0071225 A1 | 3/2005 | Bortolin et al. |
| 2005/0137015 A1 | 6/2005 | Rogers et al. |
| 2005/0177428 A1 | 8/2005 | Ganz |
| 2005/0215306 A1 | 9/2005 | O'Donnell et al. |
| 2005/0250415 A1 | 11/2005 | Barthold |
| 2005/0250416 A1 | 11/2005 | Barthold |
| 2006/0093142 A1 | 5/2006 | Schneier et al. |
| 2006/0123127 A1 | 6/2006 | Littlefield |
| 2006/0293103 A1 | 12/2006 | Mendelsohn |
| 2007/0073582 A1 | 3/2007 | Jung et al. |
| 2007/0082720 A1 | 4/2007 | Bradbury |
| 2007/0082738 A1 | 4/2007 | Fickie et al. |
| 2007/0099685 A1 | 5/2007 | Van Luchene |
| 2007/0112624 A1 | 5/2007 | Jung et al. |
| 2007/0121843 A1 | 5/2007 | Atazky et al. |
| 2007/0129998 A1 | 6/2007 | Postrel |
| 2007/0130001 A1 | 6/2007 | Jung et al. |
| 2007/0174304 A1 | 7/2007 | Shrufi et al. |
| 2008/0039166 A1 | 2/2008 | Harris et al. |
| 2008/0070690 A1 | 3/2008 | Van Luchene et al. |
| 2008/0120558 A1 | 5/2008 | Nathan et al. |
| 2008/0163379 A1 | 7/2008 | Robinson et al. |
| 2008/0215974 A1 | 9/2008 | Harrison et al. |
| 2008/0221998 A1 | 9/2008 | Mendelsohn et al. |
| 2008/0250332 A1 | 10/2008 | Farrell et al. |
| 2008/0280684 A1 | 11/2008 | McBride et al. |
| 2009/0132656 A1 | 5/2009 | Ganz |
| 2009/0248544 A1 | 10/2009 | Ganz |
| 2010/0042486 A1 | 2/2010 | Borst et al. |

FOREIGN PATENT DOCUMENTS

| | | | |
|---|---|---|---|
| CA | 2552367 | A1 | 7/2005 |
| DE | 10304779 | A1 | 9/2003 |
| EP | 1217560 | A1 | 6/2002 |
| EP | 1382372 | A1 | 1/2004 |
| GB | 2365364 | | 2/2002 |
| JP | 2002007926 | * | 1/2002 |
| JP | 2002063092 | | 2/2002 |
| WO | 0169829 | A2 | 9/2001 |
| WO | 0227591 | A1 | 4/2002 |
| WO | 02054327 | A1 | 7/2002 |
| WO | 2008067668 | A1 | 6/2008 |

OTHER PUBLICATIONS

"The Sims Booklet," dated 2000.
Daniel Terdiman, "Tech titans seek virtual-world interoperability" CNET News (Oct. 12, 2007).
Erica Naone, "Moving Freely between Virtual Worlds", Technology Review (MIT, Oct. 29, 2007).
Grace, "Web Site Tycoon's Next Goal: Sixth Grade"; Woonsocket Call, Jun. 19, 2002.
http://web.archive.org.web.20031202190119/www.monopets.com/, Dec. 2, 2003.
Lehdonvirta, "Real Money Trade of Virtual Assets: Ten Different User Perceptions"; Helsinki Institute for Information Technology, 2005.
Mark Ward, "Virtual cash exchange goes live" BBC News Online (Jan. 7, 2004).
Neopets-Archeology, 2003.
Neopian Hospital, 2002.
Non-final rejection U.S. Appl. No. 11/942,326, dated Nov. 3, 2009.
Search Report for AU 2008246242, Mar. 30, 2010.
Search Report for CN-2008101750866, English translation, dated Jan. 24, 2011.
Search Report for PCT/CA2008/002016, dated May 25, 2010.
Spence, "Neopet nation"; Toronto Star, Mar. 13, 2003.
The Helpful Neopian, Sep. 17, 2004.

* cited by examiner

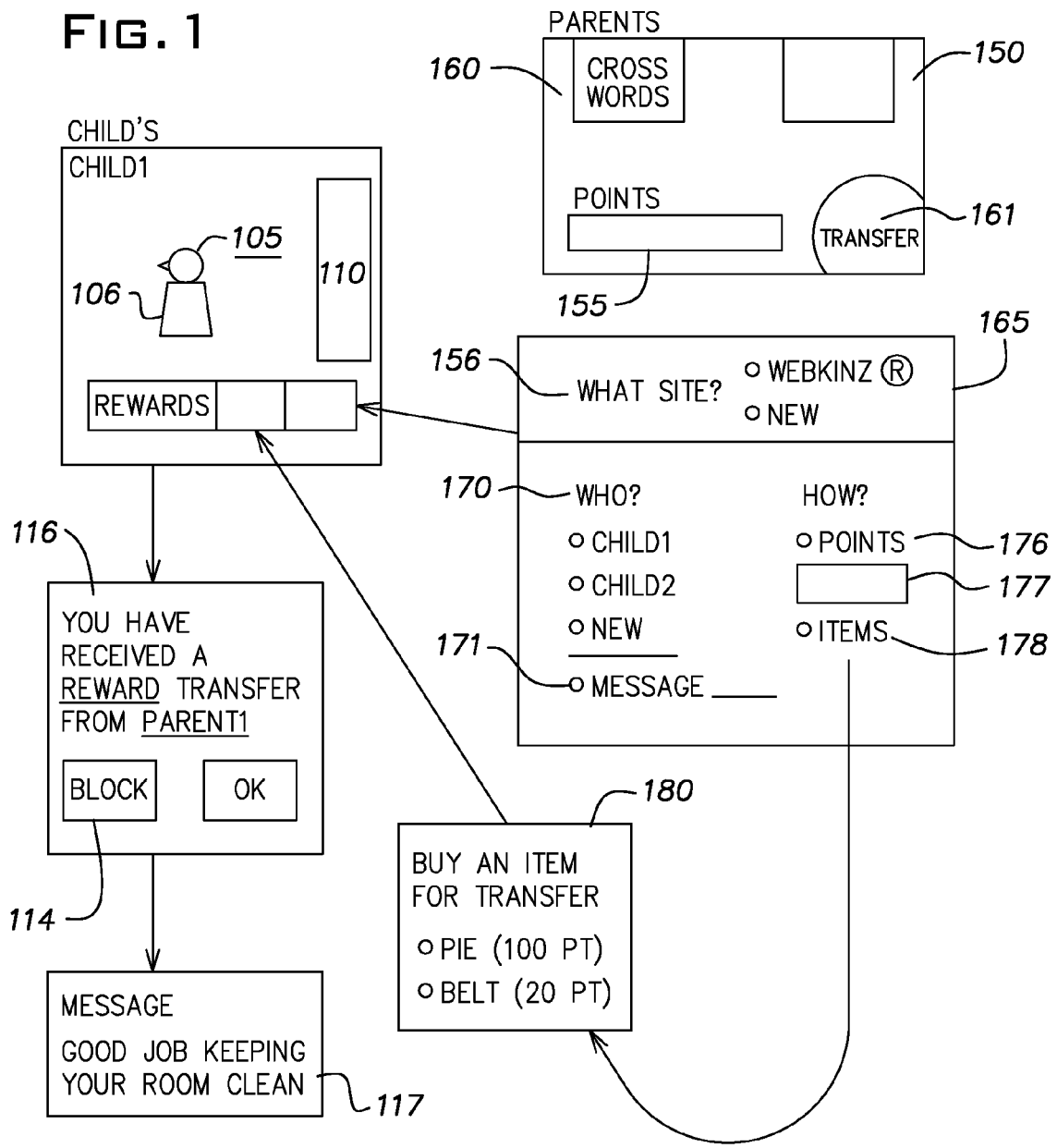
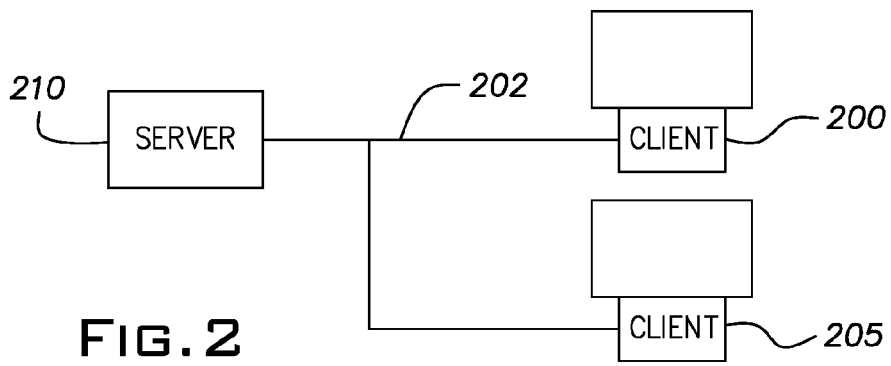

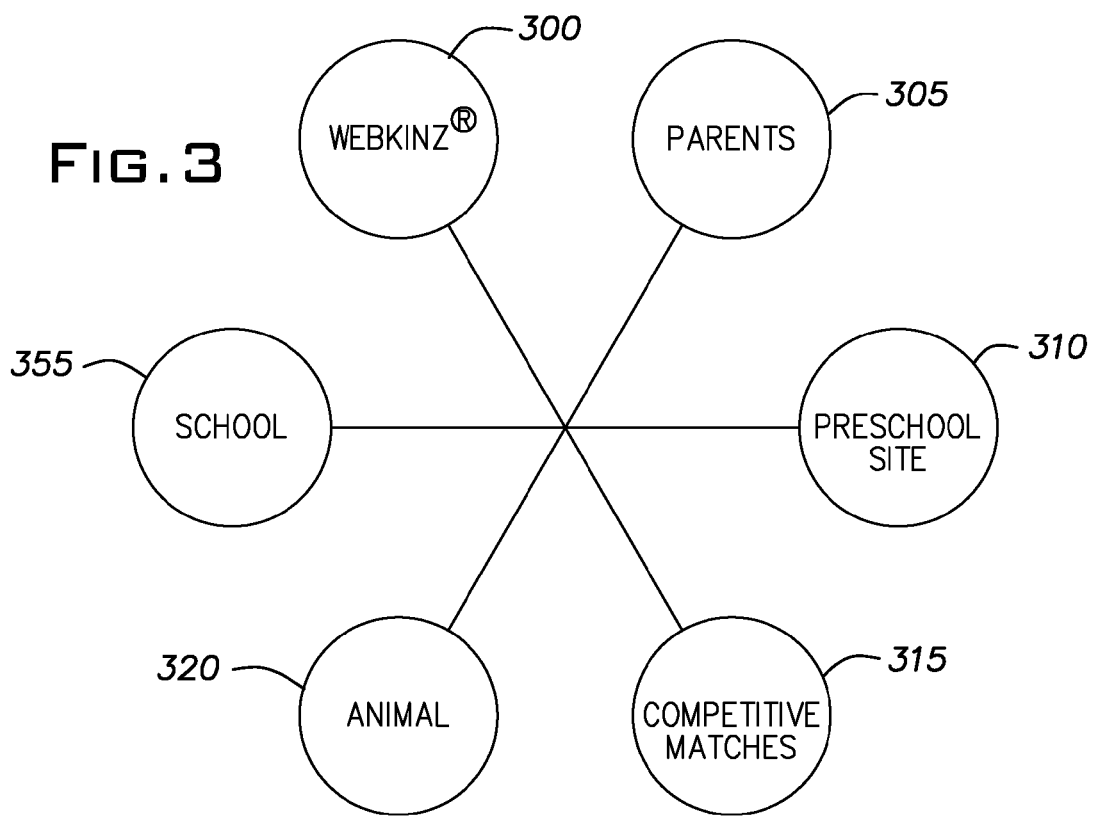
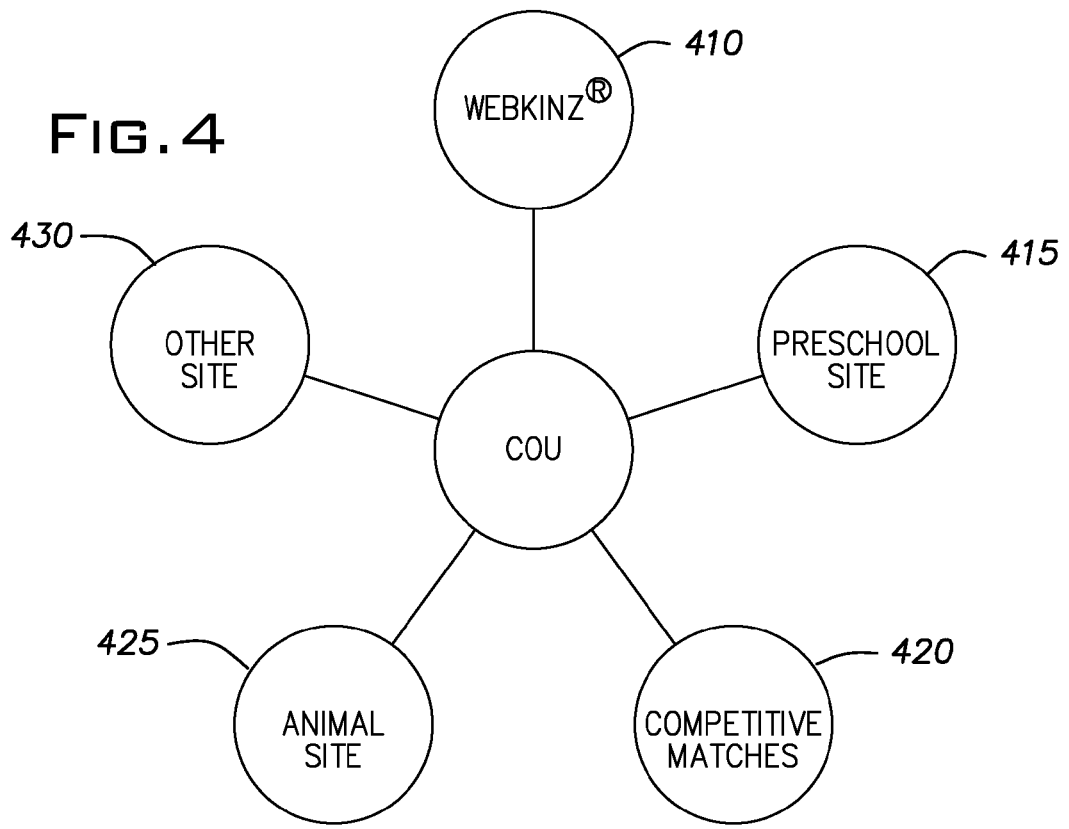

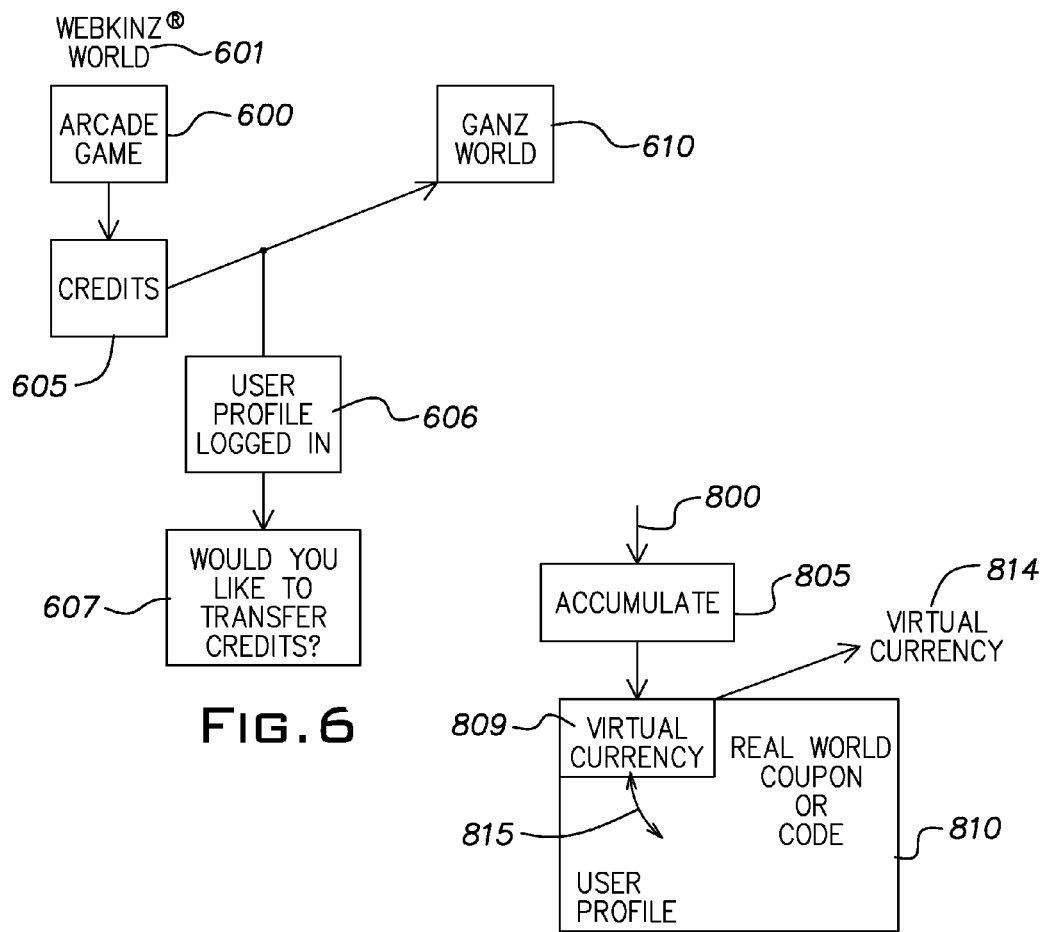
FIG. 6
FIG. 8
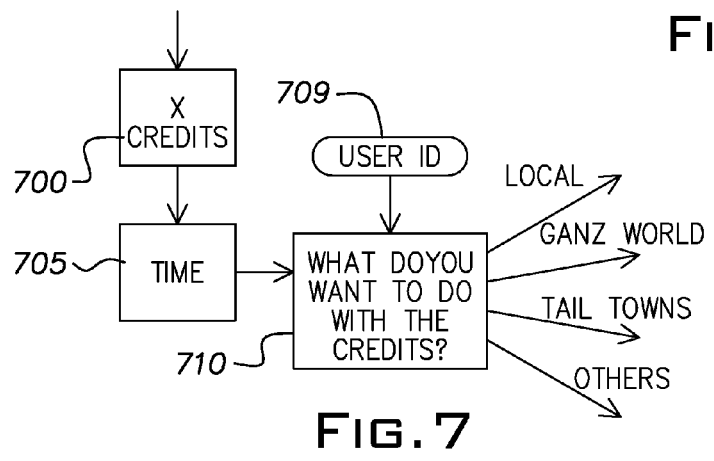
FIG. 7

CREDIT SWAP IN A VIRTUAL WORLD

This is a Continuation in Part of application Ser. No. 11/942,318, filed Nov. 19, 2007, the entire contents of which are herewith incorporated by reference.

BACKGROUND

Many children's websites exist which host activities that are intended for children's age groups, for example, children in the 3- to 13 year-old range or older. These activities can be carried out by other people of various age groups, but are often tailored towards things that will be found interesting by the specific age group or demographic.

The assignee of the present application, GANZ, hosts the website webkinz.com. A detailed description of this website is found in Our U.S. Pat. No. 7,421,569, filed Dec. 30, 2004, the contents of which are herewith incorporated by reference. In general, this website is intended for children, for example children who are younger than 14, and hence the games and activities on this website would likely be found most interesting by those children.

SUMMARY

The present application describes taking an action on a first website and based on said taking an action by a user on said first website, receiving rewards that are associated with said taking said action, and transferring those rewards to a second website different than said first website, where the second website uses a different format of rewards than the first website, and where said transferring converts said rewards into said different format so said rewards received on said first website are used on the second website.

BRIEF DESCRIPTION OF THE DRAWINGS

In the Drawings:

These and other aspects will now be described in detail with reference to the accompanying drawings, wherein:

FIG. 1 shows the websites;

FIG. 2 shows an exemplary computer connection;

FIG. 3 shows a multiple website communication capability;

FIG. 4 shows an exemplary center of the universe embodiment with a universe of websites;

FIG. 6 shows another exemplary embodiment including two websites;

FIG. 7 shows another exemplary embodiment of a website that can transfer credits to a universe of websites; and FIG. 8 shows another exemplary embodiment of a website.

DETAILED DESCRIPTION

Figure 5:
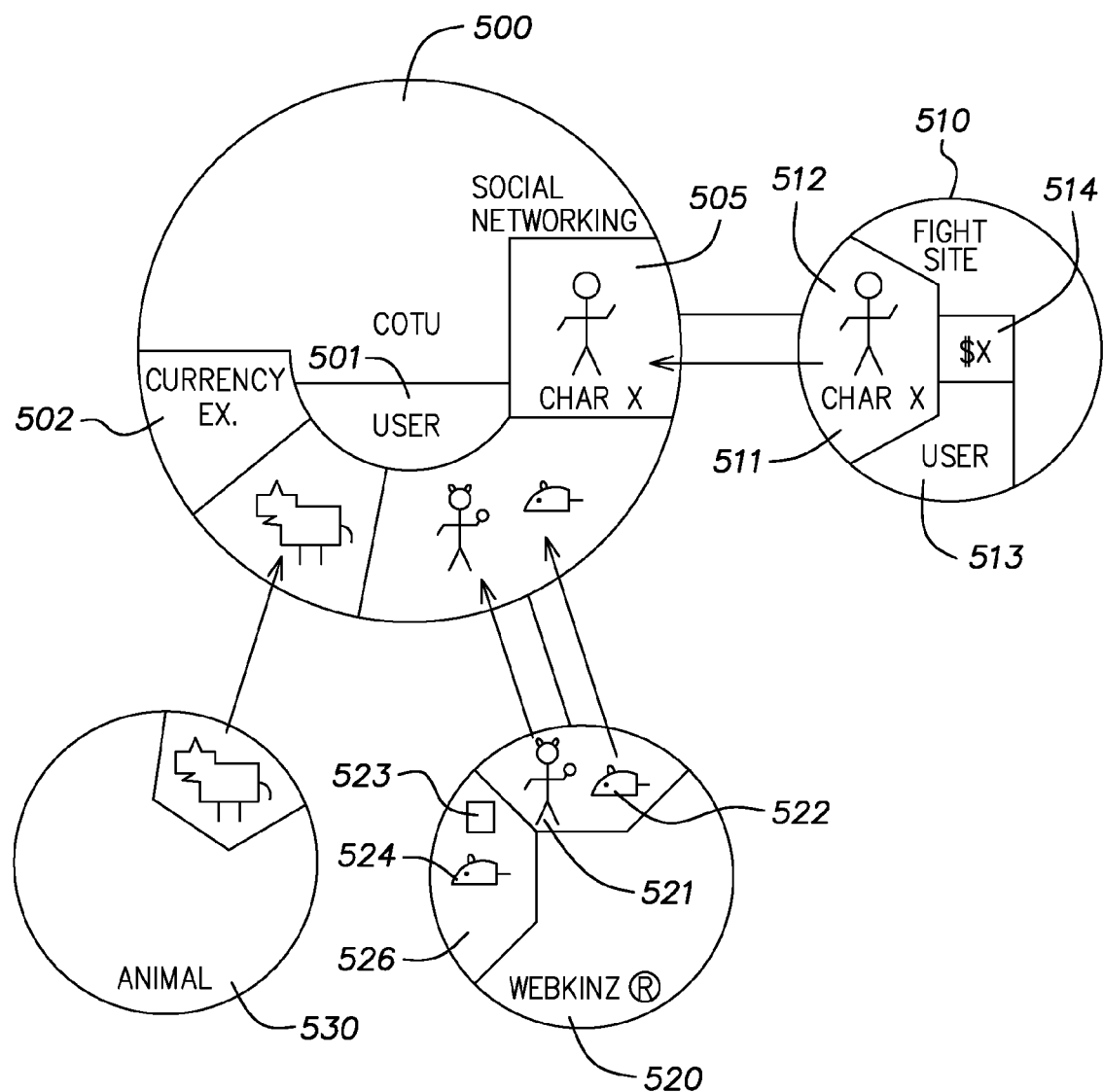
FIG. 5 shows another exemplary embodiment of the center of the universe with a universe of websites.

Activities on a first website, such as for example, the Webkinz® website, allow participants to carry out certain activities and obtain "rewards" for the activities. The rewards can be points, virtual money, or virtual items that can be used on the website. It may also be possible to purchase rewards on the website.

For example, the virtual money can be used to buy food which can be used to feed a virtual pet or other virtual character on the website. The virtual money may be usable to buy additional things such as clothing, furniture, room decorations, interactive objects, additional virtual pets, medical care, or other things, on the website.

Website participants often take actions to increase their rewards, to buy food for their virtual pets, and to provide fun activities on the website.

The inventors recognized that during certain times when the children were not playing, e.g., during the day when the children are at school or at other times when the children are busy, parents and other relatives could visit the site, and play on the site in order to get rewards for their children. For example, the mother of a six-year-old might have logged on to the website, and carried out some of the activities on the website. This may be done in order to get rewards for her child. If done, the game and/or activities may be uninteresting for the parent(s), but their children appreciate the increased rewards for their virtual pets.

Embodiments disclosed herein describe connections between websites that allow rewards to be earned on one website and transferred to another.

An aspect of the application describes a second website, such as for instance, a "parent website" having different kinds of activities intended for a different group of individuals, but that is linked to the first website. Here, the first website (e.g., webkinz.com) is a website intended for children, for example children between 2 and 13 years old, where rewards are earned, and these rewards can be used by the users on the first website. The second website has activities intended for adults, e.g., parent age or grandparent age. For example, the activities may include gossip type trivia questions, Wheel of Fortune type problems, brainteasers, or others. The activities may be either age- or gender-specific or both. For instance, such activities can be tailored for interest to a woman of the 30 to 40-year-old age range. Other games may include crossword puzzles and other adult type activities. The website may charge a fee for entry, or may be supported by advertising. The second website may be used not only by parents and grandparents, but also by friends, relatives and the users themselves, or, in essence, by anyone.

When an activity of a certain type is successfully carried out on the second website, the user (e.g., the parent) or other adult in the child's life (e.g., a teacher) gets certain kinds of points for carrying out this activity on the second website (e.g., parent website). The points can be transferred to the child's account on the child website.

FIG. 1 illustrates a relationship between the sites. 100 shows a child's site, shown here with the child called "child 1". The child's site 100 may include, for example, a virtual pet 106, which is a virtual representation of a plush toy that interacts within a room, chat room, or other activities within an activity center 105. The child may interact with the virtual pet 106 within the activity center 105. The activity center may also include virtual furniture, clothing, equipment, as well as other virtual and animated virtual objects.

The child's site 100 may also include a list of other activities shown generically as 110. A status bar 115 shows different aspects of the child's operation within the child's site 100.

The status bar shows the accumulated rewards. The child can accumulate rewards both on the child's site 100 and also on the parent site 150, which can include points received from his/her own activities on the child's site 100 and points transferred from others. The rewards can also include earned and transferred items. The items can include, for example, food to feed to the virtual pet 106, clothing or other items that can be used to dress the virtual pet, or toys or other items that facilitate interaction with the virtual pet 106 within the activity center 105.

The parent site 150 hosts different activities that are more appropriate for an adult to carry out, such as crossword puzzles and other puzzles, trivia information, information on parent issues and school issues, child health issues, pregnancy issues, first aid and medical issues, and other family issues. The parent site 150 may provide points as a reward for carrying out certain activities. For example, a parent can take a training course about proper child education and receive points for completing the course. The accumulated points or rewards are shown generically as 155, and the activities are shown generically as 160.

The parent site 150 may allow using or redeeming the points or rewards 155 on the parent site 150, but also includes a transfer function 161. Selection of the transfer function 160 brings up a separate transfer page shown as 165. At 156, the user can select one of multiple different sites, e.g., Webkinz.com, or some other site, here referred to as "new site". There may be a list of sites that can receive this transfer of rewards from the parent site 150.

Many of the parents may have multiple children, and any or all of these children can be registered in advance on the parent site 150. 170 allows selection of the recipient for the transfer. A list of the existing registered children or the possibility of adding a new child is also provided.

171 allows selection of, and entry of, a personalized message to send along with the transfer.

The transfer screen also includes the ability to decide what specifically will be transferred. A points or virtual cash transfer 176 is possible, where the user enters the number of points they want to transfer into the box 177. An item transfer 178 may bring up a separate window such as 180 which allows buying an item for transfer. This provides a list of the different items that the parents can buy, the number of points it will take to buy it, and allows purchase and transfer of that item to the child.

When the child has received a transfer, the next time they log in, a pop up transfer notification is displayed. For instance, the notification says "you have received a reward transfer from parent 1" shown as 116. The transfer may say the number of points or may provide further detail about what the child has received. If a personalized message has been sent, this is displayed as 117.

In this way, the parent can carry out activities that are more interesting to the parent. The actions, however, may still provide rewards to their child.

A specific way in which this is carried out may also use a prize pack which can be awarded or purchased at specified intervals. For example, the adult may be able to purchase or subscribe to a monthly "prize pack". The prize pack allows the adult to send some number of gifts, for example 10 gifts, to the children on the site of their choice. The prizes are presented by the parent to the child. For example, the parents may encourage good off-line activities and good behavior in the children. In one example, the parent may tell the children that if they go outside and play for an hour, or brush their teeth all week, or clean their room, then they will get a reward. The parent can choose to send a gift and can include the personalized message shown as 117 with the gift. The next time the child logs onto their account, they receive the gift and the message.

As described above, the parent may also receive free rewards such as loyalty points for playing on or otherwise using the parent site 150. In addition to playing games, the parent site 150 may provide points for completing surveys, clicking on ads, or other conventional website actions. Using the parent site 150 provides loyalty points for the parents. The points can be exchanged for virtual money or special items.

In one embodiment, the items that can be purchased at 180 may be exclusive items that can only be received from the parent site 150 and cannot be obtained at all from the child's site 100. In this case, the child's site 100 may display the exclusive items, but may appear grayed or faded out, or have some other indication to demonstrate that the items cannot be obtained from the child's site 100. The child's site 100 may indicate that they can only receive these items by a transfer from the parent site 150. This may provide further motivation for the parent to carry out actions on the parent site 150, since the rewards will be even more special.

Each of the sites may have their own form of virtual cash, e.g., Webkinz® cash for the Webkinz® site "(KinzCash™)"; but more generically, Site1 cash for a Site1, and Site2 cash for a Site2. The embodiment may allow cash from one site to be exchanged for cash from another site, as part of the rewards transfer.

Another embodiment may allow a user to block rewards from being received. For example, if the recipient does not want to receive a reward or gift from the transferring person, they can click the "block" button 114 when the message pops up indicating that a reward transfer was received. This can add, for example, the transferee to the user's permanent block list. As a result, the user can effectively block the receipt of gifts or rewards from someone that they do not like or do not want to receive gifts from, or the like.

Another embodiment is illustrated in FIG. 3. In this embodiment, a number of different websites allow different activities. Reward presentations can be transferred from any of these websites to any other website, and used on that other website. As in the above embodiments, the rewards can be used to take an action that could not be taken without the reward, e.g., to purchase an item, or change some aspect of a character or other virtual item on the website.

While the following describes only certain enumerated websites, others can also be included.

The Webkinz® site 300 is a site for children, similar to the child's site 100 described above. The parent site 305 is similar to the parent site 150, which is also described above as a site that primarily deals with parental issues, and is intended for parents, guardians, and/or grandparents of the children on the Webkinz® site 300.

The preschool site 310 is a site intended for younger children, such as preschool age, and more generally can be any site intended for preschool age children. The preschool site 310 intends to allow user interaction with virtual pets and other activities without requiring reading as would be required on the Webkinz® site 300. These sites described above can generically be considered as sites intended for preschool and elementary school children, e.g. sites which have activities that are intended for preschool and elementary school age children, and as sites which more specifically allow and facilitate interfacing with virtual pets. Apart from such child-specific sites, other sites designed for parental age users who have or care for preschool or elementary school children can operate cooperatively with such child-specific sites.

The competitive matches site 315 hosts activities that allow training and competitive matches such as fighting or dueling among characters hosted on the site. For example, each of the products on the competitive matches site 315 may be a specific product such as a ninja assassin, a ninja runner, or a kung fu expert. Each character can be purchased or otherwise obtained, in a default state, with attributes, skills and talents that are predetermined for that specific character. The attributes skills and talents are described according to a numerical designation, for example a designation between 0 and 10. Each of the skills can also have subsets, which can be described using the same kind of numerical designation.

For example, the ninja assassin character may have starting attributes with a skill of 3, speed of 1, strength limit of 8, energy limit of 8, and also have some starting talents such as hide in the shadow, and back stab. The ninja assassin can be trained, however, to increase its skill, speed, strength and energy, making it a unique character different than the default. The ninja assassin can also learn additional talents, such as different kinds of moves, either through the training or through acquiring moves by redeeming rewards. However, these skills, attributes and talents can have predetermined limits. The limits can be hard limits, e.g. a specified number that the character cannot train beyond, or soft limits, e.g. where character training becomes much more difficult beyond a soft limit.

The competitive matches site 315 enables competitions for fighting, where points, bonuses, incentives or other virtual prizes are awarded. Recipients of such rewards can convert and/or apply their rewards earned on the competitive matches site 315 to another site (e.g., another parent's site or a child's site). Other sites described herein may carry out analogous operations for other types of characters, e.g. baseball players, or others. These sites may also allow training and competitions among the trained characters.

Statistics are maintained on any of these sites, for example the win-loss record of a ninja assassin character may be recorded.

The animal site 320 is a different category of web site which enables virtually interacting with animals in different ways, e.g., by collecting, breeding and/or otherwise interacting with animals in at least some of the same way(s) that one interacts with real animals. Figurines or plush toys representing the animals can also be obtained. The figurines can also include registration codes that allow registration of the figurines as described in our application Ser. No. 11/027,647 referenced above. Also, as in that application, rewards can be obtained for games, or interactions with the pets or others, and these rewards can be used on either the animal site or on other sites.

One advantage of a rewards transfer in this kind of site (e.g., virtual collection site) is that multiple friends can pool their rewards to buy something that they could not otherwise pay for with their individual rewards, for example, and arrange a sharing agreement.

355 is a school site, which is like the parent site 150, but intended for educators. The educators are presented with different things of interest to professional educators. This also allows the educators to provide rewards to the children in their classes. For example, once a teacher registers on the school site 355, and registers the names of the children, they may be allowed to provide specified kinds of rewards to the children participating on some other sites based on their grades, homework or class behavior.

Any of these sites may allow the rewards earned thereon to be either used on the same site, or to be transferred either as virtual cash, points, or a purchase to another site.

The embodiments disclosed herein may operate over a website, where a client computer shown as 200 receives content over a channel such as the Internet 202 from a server computer 210. The server computer may also send the same or similar content to other clients shown generally as 205. The channel can be any existing channel including wired or wireless channels, and can be the Internet, private network, or other comparable ways of sending information from an information provider to a user.

FIG. 4 illustrates a center of the universe embodiment, where a special 'central' website links all the other websites in the universe.

A number of the websites previously described, including, e.g., the Webkinz® website 410, preschool site 415, competitive match site 420, animal site 425, and generic site 430 collectively form a universe 401 of websites. All of these are connected to the center of the universe site shown as 400.

Many of the sites in the universe 401 have a few things in common. The sites may operate to link a real world item or product with a virtual copy of that item. Each of the products may be limited editions—that is, that limited numbers of the products are produced, after which, the products can no longer be obtained from the manufacturer. Each site in the universe 401 may allow the user to further develop the character linked to the product. Each site uses some kind of currency or reward system that allows users to purchase virtual objects and develop their characters' characteristics. Also, each of the sites in the universe 401 has a place where the users can trade or sell their possessions, be they virtual or real possessions. Other websites may also be added to the universe 401 that do not include some or all of these features.

Each website in the universe 401 has merits of its own, that make the websites independently appealing to a target demographic. The center of the universe site 400 therefore allows interaction with a universe 401 of websites that collectively appeal to virtually everyone. While only a few sites have been described for this purpose, it should be understood that other sites of any and all types can be used in the embodiments.

The center of the universe site 400 therefore does not intend to be applicable to one demographic, but rather intends to be a hybrid site that provides a little bit of everything, making it appealing to people of all demographics and ages. Any type of site on the Internet can be used as the center of the universe site 400.

However, the center of the universe site 400 is linked with the other universe 401 sites, and provides rewards, called center of the universe dollars, that can be used on any of the universe 401 sites. In addition, the center of the universe site 400 provides cross site advertising.

The center of the universe dollars can be used in various ways. They can be exchanged for the currency of choice on any other site in the universe 401. For example, these other sites may each use their own specific form of virtual cash, e.g., Site1 cash. The center of the universe dollars may be convertible into Site1 cash. Alternatively, the center of the universe dollars can be universal virtual cash that can be used directly on any of those sites.

Center of the universe dollars can also be used to purchase items directly on the center of the universe site 400. The items on the center of the universe site 400 are exclusive items that can be used on other sites, but are exclusive in the sense that they cannot be purchased on the other sites themselves. Therefore the user can send these items to either themselves or to someone else on a different site by addressing the recipient by username or through a feature code that can be emailed to the user and/or then emailed to the intended final recipient.

The center of the universe site 400 may be financed through advertising or membership fees, but may also allow users to use real money to purchase items on the center of the universe site 400 for those users who do not want to invest the time to earn the center of the universe dollars. This can form another source of revenue. Moreover, this site may appeal to anyone who knows anybody else who enjoys any of the other universe 401 sites. Anyone can go to the center of the universe site 400, and buy special limited edition gifts; either real or virtual, for themselves or for someone else, it forms a cross-demographic draw. Moreover, since the intent of the universe 401 is to appeal to literally every different possible demographic and interest, presumably everyone will know someone who is interested in one of the universe 401 sites. Therefore, for example, a gift for any age person can be obtained on the center of the universe site 400.

Instead of needing to visit multiple different sites or multiple different stores to find multiple different gifts, this could facilitate purchasing gifts for a myriad of different people all at the same place.

The center of the universe dollars, however, can alternatively be obtained by engaging in activities on the center of the universe site. For example, center of the universe dollars can be obtained by reading, obtaining information, or simply visiting the site, for example. Other activities on the site can also be used for obtaining such rewards.

The transfers that can be carried out in FIGS. 3 and 4 may also use the blocking technique described with reference to FIG. 1, so that a user can block specified people from sending them rewards and/or gifts.

Another embodiment illustrated in FIG. 5 uses a social networking feature along with the center of the universe architecture of previous embodiments. This embodiment allows interaction between the different sites in order to carry out social networking functions between the multiple sites. The social networking functions according to the present embodiment include certain new functions for social networking that have not been available from any previous social networking systems. More generally, however, the social networking according to the present embodiment may include any kind of function where one user can show and/or discuss and/or trade and/or otherwise interact with their items that are stored or otherwise cataloged on a website. In the present embodiment, the items and discussions, however, can be from any of the sites within the universe of websites. In one embodiment, the universe of sites each allow playing a game using the characters on the website, those characters being either toys, or figures or other participants in an online based game.

According to this embodiment, each of a plurality of sites includes a social networking component. This social networking component is unlike other social networking components, since it includes not only information about the user itself, but also information about the characters that the user has acquired and/or trained on any of the universe of sites.

FIG. 5 shows the fighting site 510 having a social networking part 511 which allows any user to include their individualized character 512, here shown as character x, as part of the social networking. The user can also include personalized information about themselves, such as their interests, picture, age, or other types of information that might be found on Myspace™ or Facebook™ type websites. In addition, however, each of the sites in the universe of sites has its own version of a social network that is specific to the specific site.

The social networking component may include a purchase component shown as 514 which may offer characters for sale or trade on either one or multiple different websites. The component 514 may allow setting a specific price for the character. Alternatively, or in addition, the component may include an amount that will be necessary to trade the character. The component 514 may simply allow listing the character in a way that allows making an offer, or may be more sophisticated. In an embodiment, the center of the universe site may host all of the trades. The component 514 may also provide additional information allowing it to become a one-stop process of buying or trading items for virtual cash. An initial value for the item to be sold or traded may be set, for example by a user, as an asking price. A value determination estimator may provide users with data from which they can determine a market value of the item. The value can be based on previous sales or trades, e.g., last five trades of similar items, averages over time for trades, value when new, number of similar items that are currently for sale, or, for a rare item, the last time that a similar item was sold and information about that sale, such as the price and/or condition of the item.

The purchase component may allow the items to be purchased in center of the universe dollars, for example, after which, the seller receives the payment in center of the universe dollars. Once purchased, a secure code is provided for the transfer. The code allows the new owner to register their new item on the appropriate website. The previous registration code, used by the previous owner to register the item, is also cancelled.

FIG. 5 shows a universe of websites, including a virtual fighting site 510, the Webkinz® site 520 (the details of which are described, for example, in application Ser. No. 11/027,647, filed Dec. 30, 2004, the contents of which are herewith incorporated by reference herein), and the animals site 530, which are all connected to the center of the universe site 500. Other sites, including any of the other sites described in this application, may also be added to this universe. Each site may have its own specific social networking function that is specific to the characteristics of the site.

Each of the individual sites making up the universe may also transfer its information to the center of the universe site. For example, the fight site 510 may allow a social networking function which allows displaying one or more of the user's trained characters, such as 511, in the social networking area 512. These trained characters are, in general, unique, based on the training they have received. In addition, the character, and all the contents of the social networking, can also be transferred to and displayed on, the center of the universe site 500. The transferred social networking is shown on the center of the universe site as 505.

Other sites may similarly have social networking components that include display of collected characters from their websites. The Webkinz® site 520 allows displaying the user's collection of different Webkinz® characters 521, 522, and transferring those displays to the center of the universe site 500. The animals site 530 displays the animal(s) and transfers the display of those animals to the center of the universe site.

The center of the universe site then allows any user to choose any or all of these characters as well as their specific user information to present their data to all other viewers on the network. That is, the social networking carried out by the center of the universe site 500 can include any or all of the content from any or all of the sites that are connected thereto.

In any of these sites, the character can be featured or displayed in a number of different ways. For example, this may allow a user to show off their character(s) on the site itself, or on the center of the universe site, or via the center of the universe site to any of the other sites or on all of the sites. The character such as 511 may be shown as a screenshot of the character itself, e.g., as an image or an animation. The character can also be customized, for example, to show different clothes, colors, poses or views as customized. Alternatively, the character can be identified via a link to the originating site. A database of different characters can alternatively be used and displayed.

In sites such as the Webkinz® site 520, there may be a number of items, shown in FIG. 5 as 521, 522. Some subset of those items may be flagged as part of the user's personal collection. The items shown in the center of the universe site's version of the social networking may be dynamically updated. For example, when the user obtains a new Webkinz® character, it may be automatically added to the viewed collection both on the Webkinz® site, and also on the center of the universe site 500. Similarly, as a Fighting character such as 511 is trained, it may take on a new look, and that new look may be added to the local site and center of the universe sites.

The characters viewed may be images, and the image may be updated each time something in one of the other sites changes, such as the character.

The items which are sent and displayed may not be limited to characters but may be whole rooms. For example, the Webkinz® site may have personal rooms with furniture and the like and with items in the room. For example, 526 illustrates a room which has various pieces of furniture 523 as well as an item 524. The entire room 526 may be sent to the center of the universe site and viewed thereon as part of the social networking.

The above has described how social networking may be carried out using a center of the universe site. Also, as in both previous embodiments, interacting with the website in any way may result in rewards being provided to the user. For example, carrying out the social networking may provide center of the universe dollars to the user of the social networking.

The trades and other operations may be carried out using any of a number of different currencies. The center of the universe site may also carry out currency exchanges. The center of the universe dollars may be usable on any of the sites, as described above. As an alternative, however, the center of the universe site 500 may provide currency exchange 502 between sites. For example, the Webkinz® site may use only a currency called KinzCash™. The center of the universe site may allow providing a conversion between center of the universe dollars and the KinzCash™. The center of the universe site may also provide a universal exchange that allows exchanging between KinzCash™ and some other cash available and/or usable on one of the other sites in the universe.

According to these features, the center of the universe site may allow trading items and or selling items for different currency, and currency conversion. The virtual currency can also be stored in a virtual "bank account".

The operation can be viewed as shown in FIG. 6. A Webkinz World site 601 may be as shown on the left in FIG. 6. This site can have an arcade and/or arcade game 600. The game can be selected by the selection 600. In this embodiment, the arcade opens inside of Webkinz® World 601. However, in another embodiment, the arcade may be a separate website.

The arcade game allows the user to win credits on one site, here the Webkinz World site 601. However, another embodiment allows winning credits on one site in a way that allows using them on another site 610. According to an embodiment, for example, games can be played on the one site to obtain virtual cash to be used on another site. In the embodiment shown in FIG. 6, an arcade game is played on Webkinz® World 601 as 600. As part of playing this arcade game, the user gets credits at 605. Those credits, however, are usable on a different website, called herein the Ganz® World site shown as 610. That is, the credits won for playing the arcade game on the first website (Webkinz® World 601) are used on the second website (Ganz® World 610).

According to one embodiment, the credits may be automatically transferred. The second website may use a different format or rewards than the first website. For example, Webkinz World website may use a first form of virtual currency called W dollars. Ganz® World may use a second form of virtual currency called G dollars. The two forms of currency may have different formats, in that they are different forms of virtual cash, and also in that different amounts of this virtual cash are needed to buy different things. As an example, it may take 50 W dollars to buy a shirt in Webkinz® World, while a similar or analogous shirt may be purchased in Ganz® World for 30 G dollars.

In one embodiment, using these credits requires that the user is "logged in" to Webkinz® World, and that the user has a user profile shown as 606. That user profile has information about the user, including at least information which allows sending the credits to the user account on Ganz® World 610. The user can be logged into the Webkinz® World site, by having entered a username and password. In an alternative, a cookie-type file can store the user's login information, to automatically log the user in and associate the user with his user profile.

606 shows the user profile being available e.g. when the user is logged in. In one embodiment, when the user is logged in, the credits are automatically transferred to Ganz® World 610 without prompting.

In another embodiment shown as 607, when the user is logged in, the system queries the user about whether they would like to transfer the credits at 607.

The credits which are obtained at 605 in a first embodiment can be credits won in the format of the second website, e.g, G dollars.

In a further embodiment, the Webkinz® World site is shown in FIG. 7, in which the credits that are received are shown as "X credits" 700, which are credits that can be converted to rewards on multiple different websites. In the description that follows, the term "credits", can mean virtual cash in the form of points, but can also mean items, such as dinosaur bones, or virtual items that can be used on the website. The user earns these X credits at 700. At a specified time within the playing of the game shown at 705, for example when the user has finished playing a game and is about to quit accumulating credits, the system determines, according to techniques described herein, what will be done with those credits.

According to an embodiment, the credits can be used on the earning site—that is the site on which the credits are being earned.

According to a further embodiment, the credits, here in the form of credits or points are transferred. The points can be transferred using a universal login between the sites, that is the points are transferred according to a preset profile, in which the user has predefined that when they earn points on one website, always automatically transfer them to the other website.

According to another embodiment, the site prompts or asks the user what they want to do with the credits or items they have won at 710. For example, the user may get the opportunity to transfer these credits to the local website (here Webkinz® World) or to any of a number of different websites to which the user's userid is linked, e.g., to Tail Towns™. The user ID 709 may be linked to any of a number of different websites. Any website that has reciprocity with the local website can receive the credits obtained from carrying out the activity.

When sending the credits or points to another site, the credits can be sent to a different person and in fact the other site can be one on which the earner of the credits does not even participate. For example, a parent playing a game or carrying out an activity on a parent's site can send their credits to their child playing on the Webkinz® or Tail Towns™ site. That is, in one embodiment, the user can send the credits to an account that the user themselves does not participate in, and it can even be a site on which the user themselves does not have any kind of account.

In one embodiment, the center of the universe site may have, for example, fifteen "associated sites" and the earning user might only participate in three of those sites. However, that user can still send the credits to a friend who plays in a different one of the fifteen sites. By so doing, this operation allows sending credits to the other site.

Unlike other embodiments where the sites need to be linked, in this embodiment credits may be sent to any user on any site that has reciprocity with the earning site. For example, if a user wants to send credits to a friend on a different website (which again can be a website that the earning user does not themselves participate in), the earning user is prompted for other site information. The system can, for example, allow the user to enter a username and site name for the other website. After verification, for example by requiring the user to repeat the site name, or by any other means, the credits can be transferred to the friend in the outside website.

This may have special advantages when used in conjunction with a product, code and virtual representation as described in our previous U.S. Pat. No. 7,421,569, filed Dec. 30, 2004. Specifically, the games can be played within the confines of a virtual world in which a virtual character wins the prizes, and the prizes can be used with one or more different virtual characters on a different website. The virtual character(s) can be obtained on the website by buying a real world toy which has a hidden code therein. That hidden code can be entered into the website to show the virtual character on the website.

The above has described transferring credits obtained from playing a game. However, another embodiment may operate by finding something on the website in a virtual world, for example finding a virtual item as a kind of treasure hunt on the virtual website. In an embodiment, when the user ID 709 includes multiple different pieces of information associated therewith, the user can obtain the opportunity to transfer those pieces of information to the other website. Moreover, this can be used in any kind of website including, for example, a news website or a website that provides various links without providing a virtual world.

An advantage of the above system is that it encourages people to use different websites by providing reciprocity between the websites. This drives people to use multiple different websites knowing that they can earn credits for any one website on any of these websites. Another system, however, instead of driving the user to another website, is used to drive the user into the real world. This has the advantage of encouraging the user to visit the real world site. FIG. 8 shows an embodiment in which the user carries out an activity, e.g., either plays a game or finds an item as in the FIGS. 6 and 7 embodiments; shown generally as 800. The user accumulates items and/or virtual cash at 805. At some point during the accumulation, either when the accumulation is completed, or when requested by the user, or when a certain amount of accumulation has been obtained, the system provides the opportunity for the user to accumulate something in the real world other than virtual currency for the user.

809 shows how the virtual currency can be accumulated by the action taken on the website, e.g. by playing a game or by finding an item, or by taking any other action on the website that results in receiving a reward. In addition, there can be a real world coupon or code shown as 810 that is obtained. This allows the site to form a connection with real-world bricks and mortar places such as for example "TGI Friday's". In this embodiment, the user is given the opportunity to exchange some of his/her virtual currency for a credit that is usable at a real world establishment, here in the example, at TGI Friday's. The user can convert some of his/her currency into the gift card. This, in essence, drives people out of the virtual world into the real world and additionally allows converting to yet another currency. 815 shows that in addition to converting into the virtual currency of the different websites as 814 the user can also convert into a real world coupon at 815. In essence, the website becomes a virtual bank where the user can virtually bank some of their credit or items obtained from carrying out activities on the website. Some of the credits or items from the website can be converted from the virtual bank into a form that can be used in the real world.

According to another embodiment, the activity translates directly into a real world discount that can be used in a real world store. For example, an interactive game/advertisement can be shown. The advertisement may include a virtual character and different kinds of food to be fed to the virtual character. As part of that advertisement, the user feeds the virtual character a hamburger, some french fries, and a soda. Once having fed the virtual character all of these things, the user receives a coupon directly as a reward for properly finishing the game. Therefore, in contrast to the virtual bank embodiment described above, this embodiment produces real world coupons, discounts or the like directly from the activity such as the game or other activity.

The real world coupon can be for any item in the real world. For example, one embodiment can partner with a movie theater, and give movie theater coupons, tickets or discount in return for the virtual currency. The user can get a larger discount on a movie that is linked to certain games that can be played as 800. Also, the real world coupon can be thematically or otherwise related to the game or other part of the website. For example, in an embodiment the user can play a game that has a theme of a Snow White movie. Winning this game may provide the user with the opportunity to convert his or her winnings from winning that game into a discount on the Snow White movie. Similarly, the user can find a Snow White item that is usable in the virtual world, and get a reward for finding that item. The rewards can include a discount or coupon good for going to the Snow White movie or good for money off tie-ins to the Snow White movie. Another embodiment allows the user to complete the activity and obtain the discount directly on the item, so there are no "winnings" to convert.

Yet another embodiment provides designated daily deals, such that the conversion from the virtual currency is only good for the daily deal. For example, this might be like a Groupon® where the user can convert the virtual currency they've earned for that Groupon® but only on a certain day. As one example, the user may be able to get five dollars off at X Movie Theater, but only on credits won on Mar. 1, 2011. This can, for example, encourage people to use the website on that day, since the credits they win on that day will have a special use that is not usable on other days. One embodiment of the deal of the day is for virtual items, while another embodiment provides coupons good in the real world for these credits but only on certain days. Another embodiment allows the user to convert their "winnings" directly to the coupon with no currency being obtained.

In any of these embodiments, the rewards/points/items can be obtained by parents taking actions on a parent's club site to earn rewards that are associated with the childrens' site website. This can be done in various ways—site recognizes your accounts and prompts/asks you where you want to send the points/items; or the site recognizes your accounts and other accounts and prompts/asks you where to send them, or the site can update to remember accounts of the others you have sent to. Alternatively, the system can know what the account options are; or the system might not know but it asks where to send them; or the system can send automatically; or the system can automatically updates to include new accounts/users/sites rewards sent to others.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other items can be purchased and received in this way.

Also, the inventor intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

Another aspect of the bank for virtual cache that allows club loans, credit ratings, and life, all of which are made possible by this system.

What is claimed is:

1. A method comprising:
    on a server computer, receiving an indication of a user taking an action on a first website;
    based on said taking an action by a user on said first website, said server computer awarding rewards that are associated with said taking said action; and
    said server computer transferring said rewards to a second website different than said first website, where the second website uses a different format of rewards than the first website, and where said transferring converts said rewards into said different format so said rewards received on said first website are used on the second website;
    obtaining information about where to transfer the rewards, where the rewards can be transferred to a plurality of different websites, and where said user profile includes information about each of said plurality of different websites,
    wherein said taking an action on the first website comprises playing a game on the first website and obtaining points for playing the game.

2. A method as in claim 1 further comprising determining on the first website if the user of the first website is associated with a user profile, and using information in the user profile to transfer said rewards to the second website.

3. A method as in claim 2, wherein said rewards are automatically transferred without prompting the user.

4. A method as in claim 2, further comprising prompting the user about whether they want to transfer the rewards to another website.

5. A method as in claim 2, further comprising providing a special transfer which is good for only a limited time, and allowing said transfer between said websites and said special transfer only during said limited time.

6. A method as in claim 5 wherein said special transfer is only good for rewards earned during said limited time.

7. A method comprising:
    on a server computer, receiving an indication of a user taking an action on a first website;
    based on said taking an action by a user on said first website, said server computer awarding rewards that are associated with said taking said action; and
    said server computer transferring said rewards to a second website different than said first website, where the second website uses a different format of rewards than the first website, and where said transferring converts said rewards into said different format so said rewards received on said first website are used on the second website, further comprising determining on the first website if the user of the first website is associated with a user profile, and using information in the user profile to transfer said rewards to the second website,
    wherein said first website hosts a virtual world with virtual characters.

8. A method as in claim 7 further comprising prompting the user about where to transfer the rewards, where the rewards can be transferred to a plurality of different websites, and where said user profile includes information about each of said plurality of different websites.

9. A method as in claim 7 wherein said taking an action on the first website comprises finding a virtual item on the first website where the virtual item comprises a virtual item is found in said virtual world that is hosted on said first website.

10. A method as in claim 7 further comprising registering a virtual character using a code that is associated with a real world item, and obtaining a character based on the code that resemble said real world item, and where said virtual character that is registered is associated with said user profile.

11. A method as in claim 7 wherein said rewards are virtual cash.

12. A method as in claim 7 wherein said rewards are items that can be used on the website.

13. A method as in claim 7 wherein said transferring comprises transferring said rewards to a website in which the user does not participate.

14. A method as in claim 7 wherein said rewards are automatically transferred to the second website.

15. A method as in claim 7 wherein the user is prompted for where to send said rewards.

16. A method comprising:
- on a server computer, receiving an indication of a user taking an action on a first website;
- based on said taking said action by a user on said first website, awarding rewards that are associated with said taking said action; where said action includes an action that is based on a theme; and
- said server computer converting said rewards into a coupon that is usable in a real world operation associated with said theme.

17. A method as in claim 16 wherein said theme is a movie theme, and said rewards are converted into a coupon that is usable for a discount from said movie theme.

18. A method as in claim 17 wherein said coupon is usable for a discount from a movie admission.

19. A method as in claim 16 further comprising providing a special transfer which is good for only a limited time, and allowing said transfer between said websites and said special transfer only during said limited time.

20. A method as in claim 19 wherein said special transfer is only good for rewards earned during said limited time.

\* \* \* \* \*